US012368012B1

(12) United States Patent
Meshot et al.

(10) Patent No.: US 12,368,012 B1
(45) Date of Patent: Jul. 22, 2025

(54) STABILIZED LIQUID-SOLID ELECTRICAL CONTACT

(71) Applicant: Atomic Machines, Inc., Emeryville, CA (US)

(72) Inventors: Eric Meshot, Emeryville, CA (US); William Boettcher, Emeryville, CA (US); Gregory C. Ghahramani, Emeryville, CA (US); James Stolken, Emeryville, CA (US)

(73) Assignee: Atomic Machines, Inc., Emeryville, CA (US)

(*) Notice: Subject to any disclaimer, the term of this patent is extended or adjusted under 35 U.S.C. 154(b) by 0 days.

(21) Appl. No.: 19/097,554

(22) Filed: Apr. 1, 2025

Related U.S. Application Data

(63) Continuation of application No. 18/676,876, filed on May 29, 2024.

(60) Provisional application No. 63/504,873, filed on May 30, 2023.

(51) Int. Cl.
*H01H 29/06* (2006.01)
*H01H 29/28* (2006.01)

(52) U.S. Cl.
CPC ............ *H01H 29/06* (2013.01); *H01H 29/28* (2013.01)

(58) Field of Classification Search
CPC ...... H01H 29/06; H01H 29/28; H01H 1/0036; H01H 1/021; H01H 2001/0052; H01H 29/00; H01H 2029/008; H01R 13/03
See application file for complete search history.

(56) References Cited

U.S. PATENT DOCUMENTS

| | | | |
|---|---|---|---|
| 3,369,094 A | 2/1968 | Langberg et al. | |
| 5,330,088 A | 7/1994 | Whitlow et al. | |
| 7,276,991 B2 | 10/2007 | Rubel | |
| 2003/0015409 A1 | 1/2003 | Narasimhan | |
| 2004/0159533 A1* | 8/2004 | Kondoh | H01H 1/0036 200/182 |
| 2004/0238338 A1 | 12/2004 | Ganz et al. | |
| 2005/0104693 A1 | 5/2005 | Youngner | |
| 2006/0274470 A1 | 12/2006 | Srinivasan et al. | |

(Continued)

FOREIGN PATENT DOCUMENTS

| | | |
|---|---|---|
| DE | 2611016 A1 | 9/1977 |
| GB | 2130795 B | 7/1986 |

(Continued)

OTHER PUBLICATIONS

International Search Report and Written Opinion mailed Sep. 3, 2024 in International Patent Application No. PCT/US2024/031488, 17 pages.

*Primary Examiner* — Edwin A. Leon
(74) *Attorney, Agent, or Firm* — David D. Hsu; Polsinelli LLP

(57) ABSTRACT

An electrical contact is provided that includes a conductive base contact. The electrical contact may include a layer of a second material resistant to reaction with a liquid metal. The layer of second material may be bonded to the base contact. The electrical contact may include a layer of a third material. The third material may be a reaction product of a reactant metal with at least one metal of the liquid metal. The electrical contact may include a layer of the liquid metal that wets to a surface of the third material.

22 Claims, 8 Drawing Sheets

(56) References Cited

U.S. PATENT DOCUMENTS

2011/0062003 A1* 3/2011 Srinivasan ........... H01H 1/0036
977/932
2014/0017842 A1* 1/2014 Aharon ............... B81C 1/00341
438/50
2015/0273469 A1 10/2015 Reed et al.

FOREIGN PATENT DOCUMENTS

| | | | |
|---|---|---|---|
| GB | 2257564 | A | 1/1993 |
| WO | 2007024732 | A2 | 3/2007 |
| WO | 2015076751 | A1 | 5/2015 |
| WO | 2023041198 | A1 | 3/2023 |

* cited by examiner

STABILIZED LIQUID-SOLID ELECTRICAL CONTACT

CROSS-REFERENCES TO RELATED APPLICATIONS

The present application is a continuation application of U.S. application Ser. No. 18/676,876, filed May 29, 2024 (published as US 2024/0404722 A1), which claims the benefit of priority of U.S. Provisional Application No. 63/504,873, filed May 30, 2023, the entire contents of both of which are incorporated herein by reference for all purposes.

BACKGROUND

Technical Field

The present disclosure pertains to electrical switching and, more particularly, to a contact employing both dry and liquid materials to achieve a low resistance, low contact force electrical contact switching.

Description of the Related Art

Typical Solid State Relays (SSRs) are implemented using Triacs, Field Effect Transistors (FETs), or Insulated Gate Bipolar Transistors (IGBTs). These semiconductor devices have no moving parts. However, devices with multi-amp current capacity have on-state resistance values of more than several milliOhms. The devices must be mounted to large heat sinks to allow them to dissipate the heat generated as current flows through the contact at these resistance levels. Semiconductor switches do not provide a physical air gap between the contacts of the switch when opened. An air gap between the switch contacts is required in many applications, such as circuit breakers, in order to provide galvanic isolation and to eliminate any leakage current. Use of a semiconductor switch in this type of application, e.g., circuit breaker, requires an electromechanical relay coupled in series with the semiconductor switch in order to provide this galvanic isolation.

Designers have long used soft (low hardness) metallic alloys, often including silver, as the contact material in switches to increase the surface area (for a fixed contact force) between the two contacts. These soft alloys deform plastically under pressure applied between the contacts to fill in voids between bumps or asperities in the contact surface of an opposing contact. While this is effective, it requires large forces (proportional to the material hardness) to plastically deform the contact material, and the resulting resistance in a standard electromechanical relay is about 10 to 30 milliOhms. The material hardness (H) is conventionally defined as the force (F) per unit permanently deformed area (A). Treating the contact material's hardness (H) as fixed, the actual contact area is then proportional to the applied force (F) divided by the hardness (H) and expressed as F/H. For a fixed amount of contact force, contact hardness can be reduced to increase the contact area through deformation and decrease the associated contact electrical resistance.

This reduction in hardness, however, can cause deleterious side effects such as excessive contact wear, galling, and self-welding that limits its use as a practical approach for solid contacts of arbitrarily low electrical resistance.

BRIEF SUMMARY

A contact is provided in accordance with the present disclosure that includes a first contact member having a base with an exposed surface, the base having a first pocket opening to the exposed surface, the first pocket having a circumscribing side wall and a bottom wall that defines an interior of the first pocket; a first metal layer on the bottom wall of the first pocket and having a top surface that is below the exposed surface of the first contact member; a liquid metal layer on the top surface only of the first metal layer and extending above the exposed surface of the first contact member; and a second contact member having a contact surface, the second contact member positioned adjacent the first contact member in an open position and movable to a closed position in which the contact surface of the second contact member contacts and compresses the liquid metal layer and the first metal layer until the contact surface of the second contact member abuts the exposed surface of the first contact member.

In accordance with another aspect of the present disclosure, the contact includes a second pocket formed in the exposed surface of the first contact member, the second pocket circumscribing the first pocket and having a bottom wall that is below the exposed surface of the first contact member and above the bottom wall of the first pocket, the second pocket further comprising a circumscribing side wall and a bottom wall that define an interior of the second pocket, a portion of the interior of the second pocket overlapping the interior of the first pocket.

In accordance with another aspect of the present disclosure, the first and second pockets have different diameters that are structured with laminated multiple layers of planar material wherein a bottom layer has no hole, a second layer bonded above the bottom layer has a hole of a first diameter, and a third layer bonded above the second layer that includes a hole of a larger diameter than the first diameter.

In accordance with a further aspect of the present disclosure, the liquid metal layer is formed of a compliant material that is displaced by pressure applied by the second contact member in the closed position and returns to an original shape in response to the second contact member moving to the open position.

In accordance with yet another aspect of the present disclosure, excess material from the liquid metal layer is displaced into the second pocket in response to pressure from the second contact member moving into the closed position and, upon the second contact member moving to the open position, the excess material from the liquid metal coating is driven back to the original shape into the meniscus shape in response to a repulsive force generated between material that forms the first contact member and material that forms the liquid metal layer. The driving force is further generated by a surface tension in the liquid metal layer.

In accordance with another implementation of the present disclosure, a contact is provided that includes a first contact member formed of material containing tungsten, the first contact member having an exposed surface and a first pocket opening to the exposed surface, the first pocket having a circumscribing side wall and a bottom wall that define an interior of the first pocket; a first metal layer on the bottom wall of the first pocket and having a top surface that is below the exposed surface of the first contact member; a liquid metal layer formed of a material containing a eutectic or near-eutectic GaInSn alloy on the top surface only of the first metal layer and extending above the exposed surface of the first contact member.

In accordance with another aspect of the present disclosure, the liquid metal layer is compliant and is displaced by pressure applied to the liquid metal layer and returns to an original shape in response to removal of the pressure on the liquid metal layer.

In accordance with a further aspect of the present disclosure, a second pocket is formed in the exposed surface of the first contact member, the second pocket circumscribing the first pocket and having a bottom wall that is below the exposed surface of the first contact member and above the bottom wall of the first pocket, the second pocket further comprising a circumscribing side wall and a bottom wall that define an interior of the second pocket, a portion of the interior of the second pocket overlapping the interior of the first pocket.

In accordance with yet another aspect of the present disclosure, excess material from the liquid metal layer is displaced into the second pocket in response to the pressure applied to the liquid metal layer, and upon the second contact member moving to the open position the excess material from the liquid metal coating is driven back to the original shape into the meniscus shape in response to a repulsive force between the tungsten in the first contact member and the Galinstan alloy in the liquid metal layer. The driving force can further include a surface tension in the liquid metal layer.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

Figure 1A:
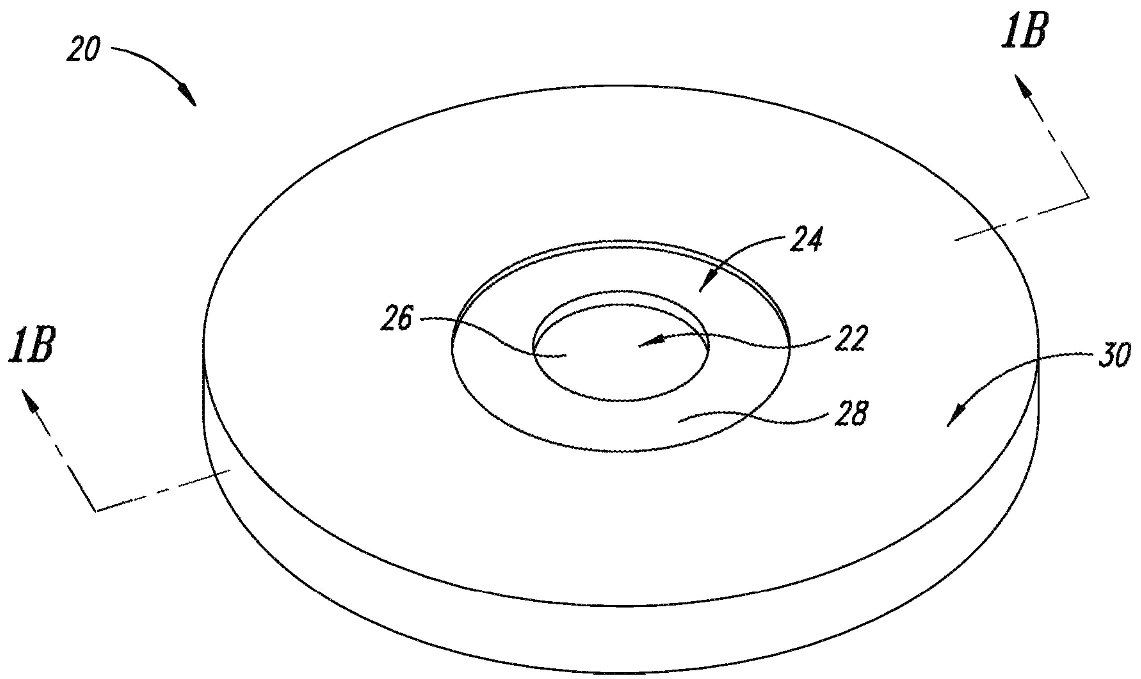
FIGS. 1A and 1B illustrate a contact member formed in accordance with one implementation of the present disclosure.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with breakers, relays, coils, and typical electrical components have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" means that a particular feature, structure, or characteristic described in connection with the implementation is included in at least one implementation. Thus, the appearance of the phrases "in one implementation" or "in an implementation" in various places throughout this specification are not necessarily all referring to the same implementation. Furthermore, the particular features, structures, or characteristics may be combined in any suitable manner in one or more implementations. It will be appreciated that for simplicity and clarity of illustration, where considered appropriate, reference numerals may be repeated among the figures to indicate corresponding or analogous elements or steps.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

It has been found that wetting one or both switch contacts with a conductive fluid provides improved surface contact with minimal force. Depending upon the surface energy (or surface tension) of the liquid-solid, liquid-vapor, and solid-vapor interfaces, a liquid-solid contact interface may support a liquid film of finite static thickness (repelling or non-wetting case) or tend to zero thickness at a finite number of interface points (attractive or wetting case). Both phenomena may be exploited to obtain advantageous electrical contact properties. However, existing solutions for liquid contacts come with their own sets of problems. The liquid should ideally have both high thermal and electrical conductivity, be preferentially metallically bonded, and operate over a wide temperature range including room temperature. This can be achieved by using liquid metals. Other classes of conductive fluids, such as ionic liquids, do not satisfy several of these requirements including their conductivity, which is orders of magnitude lower than liquid metals. Mercury, a liquid metal at room temperature, was used as a switch in thermostats until its toxicity became apparent.

Other liquid metals, such as sodium-potassium (NaK), gallium, and gallium alloys are less toxic, but they may react with most metals and therefore are not necessarily reliable as wetted contacts. "Galinstan®" is a particular near-eutectic alloy of gallium, indium, and tin with a freezing point of −19° C. and a boiling point of 1300° C. Gallium is known to react to form intermetallic phases with a wide range of metals, which threatens the stability of a solid metal electrode surface. For example, copper is a common electrode material because of its superior electrical conductivity, but intermetallic crystals form with gallium at temperatures just barely above room temperature. This persistent reactivity renders the contact interface compromised because: (a) gallium is depleted from the Galinstan alloy, which alters its chemical composition and raises its liquidus temperature (e.g., "slushy", semi-solid vs liquid); and (b) surface roughness and asperities increase due to intermetallic crystal growth.

The present disclosure pairs one of several liquid metals with a solid contact material, using a stabilized interface between the liquid and solid to both promote adhesion of the liquid metal to the solid contact while restricting reactions between the liquid metal and solid metal. The present disclosure includes implementations wherein this interface is fabricated inside a recessed cavity to eliminate the deleterious contributions of the intermetallic crystal asperities during repeated opening and closing of the contact surfaces (i.e., switching). Switch contacts formed in accordance with the present disclosure have been tested, and they have demonstrated electrical resistance of less than 100 microOhms, 10 to 100 times lower than the several milliOhms for a solid state relay or tens of milliOhms for a conventional electromechanical contact.

Liquid metals, including the Galinstan alloy, have been used as a flowing bridge between two stationary electrodes. Some of this work has been used to demonstrate the possibility of stabilizing the surface of an electrode prior to exposing it to the Galinstan alloy. U.S. Pat. No. 6,570,110 describes the use of liquid gallium or gallium alloy to bridge the space between two fixed electrodes.

In the present disclosure, a multi-layer material interface is provided within fabricated topographical geometries on one or both solid contact surfaces. In summary, this engineered system comprises one or more of several key functional features: (1) a liquid metal that maximizes both mechanical compliance and surface area through which to conduct electrical current; (2) a rationally designed and intentionally reacted intermetallic layer (which could be crystalline, quasi-crystalline, or amorphous) that establishes chemical stability between the liquid metal and the adjacent underlying material(s) and therefore also promotes adhesion between liquid metal and the solid contact surface; (3) a contiguous diffusion barrier layer that prevents atomic transport and chemical reactions between the liquid metal and the underlying material(s); (4) a primary base contact material layer that forms the majority of the electrical current path; and (5) fabricated topographical geometries (e.g., recesses and/or asperities) in the base contact layer that serve to (a) register and level the solid-solid contact interaction in the closed state (e.g., providing a "hard stop"), (b) displace the intermetallic layer, which may have nano-to-microscale topographical structural features either natively/incidentally or intentionally created, away from the solid-solid contact interface and thus limit the potential for electrical arcing, and (c) protect the intermetallic layer and/or barrier layer from repeated mechanical impact and potential deformation during the act of switch closure; and (5) a second contact formed of a conductor that is robust against reactions with the liquid metal but which may not easily wet with the liquid metal and may or may not be itself wetted with liquid metal.

Each of the key technical and functional features is described in greater detail below.

Liquid metal: A gallium-based alloy (nominally 68.5% gallium, 21.5% indium, 10.0% tin by weight) is employed in a thin-film form or as droplets, either continuously across the contact surface or in select areas that may be defined by lithographic patterning of the underlying intermetallic adhesion layer and/or the physical topographical geometries (e.g., physical confinement). The underlying intermetallic adhesion layer and liquid metal are applied to one (preferably) or both sides of the opposing contact surfaces using a liquid dispenser. It is to be understood that these metals may also be deposited in colloidal suspensions or physical vapor deposition (e.g., sputtering, thermal or electron-beam evaporation), possibly followed by annealing to homogenize the alloy. Other suitable conductive liquids at or near room temperature may include elemental gallium and other gallium-based alloys (e.g., with indium, tin, zinc, and/or bismuth), mercury, sodium potassium alloy (NaK), cesium, rubidium, and francium. Adding other components to the liquid metal mixture may provide enhanced characteristics, such as adding cesium to Nak to lower its freezing point to −78° C., or adding lithium to NaK to improve its ability to attach to copper or other metals.

Intermetallic layer: Tantalum-gallium binary-phase intermetallic crystals are employed as an interface between the liquid metal and the underlying materials. Tantalum is selected in one implementation because it performs well due to its low solubility in gallium (e.g., ≤0.1 weight % at 600° C.) compared to most other metals, and its most prominent phases on the gallium-rich side of the phase diagram ($TaGa_2$, $TaGa_3$) are stable in the presence of gallium up to at least 520° C. Testing and experimentation confirms no detectable intermetallic formation reactions occur between either tantalum and indium or tantalum and tin. Tantalum is deposited by magnetron sputtering to achieve a film of approximately 500-1000 nanometers (but could range from 1 nanometer to 1 millimeter), the thickness of which is important to overcome the surface roughness of the underlying layer (e.g., one implementation employs tungsten with root mean-square roughness values 400-1200 nanometers). Other methods for depositing tantalum include electron-beam evaporation, thermal evaporation, chemical-vapor deposition, electrochemical deposition, and colloidal film casting.

During the contact formation process, the gallium or gallium-based alloy is then deposited (see above) on the tantalum film and the materials are annealed in an inert atmosphere for dwell time of 10 min to 70 hours at temperatures spanning 200-650° C. Typically, this is run for 2 hours at 550° C. in atmospheric-pressure argon (≤0.2 ppm $O_2$, ≤0.5 ppm $H_2O$) and then left to cool to room temperature without quenching or removing excess liquid metal. This process may be accelerated by rapid thermal annealing using radiant heaters at temperatures up to 1060° C. (melting point of $TaGa_2$). During this annealing process, the tantalum reacts with the gallium to form Ta—Ga crystals ranging 0.1-15 micrometers, which energy dispersive X-ray spectroscopy (EDS) analysis indicates are primarily $TaGa_2$ and $TaGa_3$. The excess liquid metal may be removed (e.g., physically with pressurized gas stream or chemically using anhydrous hydrochloric acid in ethanol) and replaced with fresh Galinstan alloy to maintain the eutectic stoichiometry in the bulk liquid for subsequent contact operation. Other useful metals that could be reacted in this application to form the intermetallic interfacial layer include titanium, vanadium, chromium, iron, zirconium, niobium, ruthenium, molybdenum, tungsten, and rhenium.

Diffusion barrier: A diffusion layer should be contiguous with no porosity and minimal vacancy defects through which the liquid metal is able to diffuse and reach the pure solid metal in the base contact. It should be sufficiently thick to prevent undesirable interactions, yet sufficiently thin to maintain low electrical resistance. The thickness of this barrier may be between 10 nanometers and 10,000 nanometers, depending on the application. In one implementation such diffusion barrier layer may have a thickness between 10 and 200 nanometers. In other implementations the thickness may be between 200 and 500 nanometers, between 500 and 1000 nanometers, 1000 and 5000 nanometers or 5000 and 10,000 nanometers. Two implementations of the diffusion barrier are described herein. One implementation leverages a high-stability intermetallic phase of the liquid metal and base contact metal formed in situ and thus limits further reactions between the two materials. There may be one intermetallic phase that acts as both adhesion promoter and diffusion barrier, or multiple intermetallic phases. In one implementation a high-stability gamma-phase Cu4Ga9 was used on a copper base contact with lower-stability theta-phase CuGa2 on top (as validated by cross-sectional SEM/EDS), interfacing with the liquid metal Galinstan alloy.

The other implementation of the diffusion barrier involves depositing a third material positioned in the stack between the intermetallic and base contact material. In one implementation tungsten is used because it is known to be an excellent barrier against copper diffusion, and testing and experiments show it is stable in the presence of gallium without degradation to temperatures as high as 650° C. Tungsten can be deposited on a copper base contact material by magnetron sputtering, chemical-vapor deposition, electrochemical deposition, co-sputtering of copper and tungsten to create a gradual transition from copper to tungsten to mitigate thermal mismatch effects, or diffusion bonding of two foils of copper and tungsten. Other diffusion barrier materials may include ruthenium, titanium, tantalum, titanium nitride, tantalum nitride, tungsten nitride, niobium nitride, molybdenum nitride, titanium-tungsten alloy, tantalum carbide, cerium oxide, and graphene.

Base contact: Copper contacts can provide a low on-resistance in a switch device. The implementations of the diffusion barrier described above enable the use of copper with liquid metals that would otherwise react with and corrode a copper base contact. Other less conductive base contact materials, including tungsten, molybdenum, tantalum, and niobium, may be selected instead of copper in exchange for better chemical compatibility and stability with the liquid metal and other materials in the multi-layer system.

Topographical geometries: In this implementation, a positive stop is created for the contacts by machining one or more pockets in at least one of the electrodes. The non-wetted opposing electrode will make mechanical contact with the top of the pocket wall, providing a well-defined gap and volume in which the liquid metal may remain. The pockets may be formed with two sections with different depths as described in the representative implementation below and illustrated in the accompanying figures.

Figure 1B:
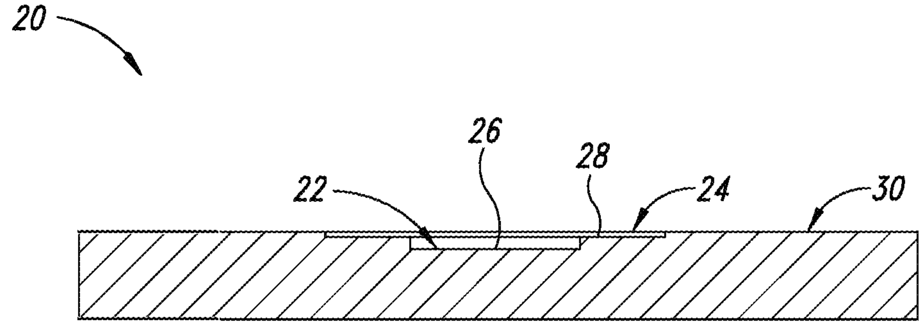

Referring to FIGS. 1A and 1B, shown therein is a representative first contact 20 having a centrally located circular pocket 22 having a wall 23 (shown in FIG. 2) surrounded by a shallower circumscribing pocket 24. Both pockets are circumscribed by a larger ring surface area 30 that acts as a stop. It will be appreciated that the pockets 22, 24 could be formed in other geometric planform shapes including ovals. The pockets 22, 24 may be formed using any acceptable technique known to those of skill in this technology, including without limitation machining on a milling machine, laser machining using pulsed or continuous wave lasers, photochemical etching, electric discharge machining (EDM), reactive ion etching, or any other technique suitable for making pockets of the desired geometry.

Figure 6A:
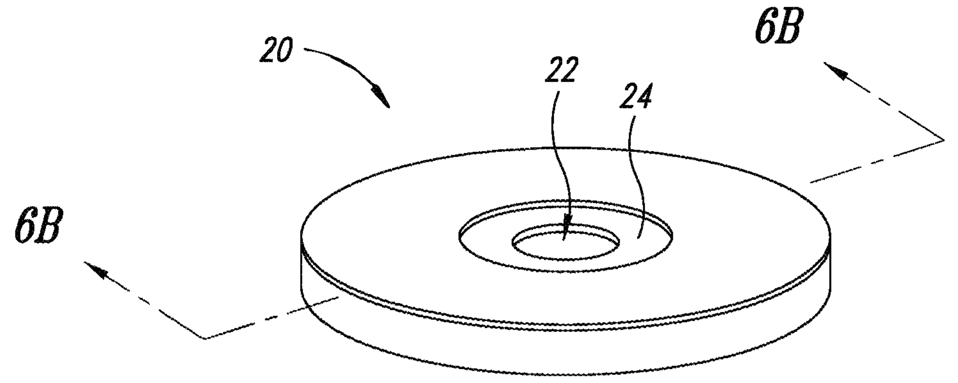
FIG. 6A is an axonometric illustration of a means of assembling a contact by laminating multiple layers.
Figure 6B:
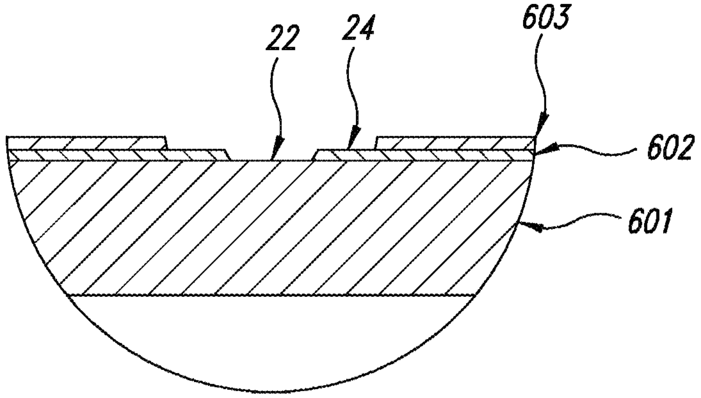
FIG. 6B is a cross section view taken along line B-B of FIG. 6A.

These pockets 22, 24 of varying areas or geometries may be formed by stacking and laminating layers of planar material. Each size and shape of opening may then be cut completely through the material using a saw, laser, water jet, or other cutting technique. The layers may be bonded by the use of adhesive, welding, soldering, or any other technique. This means of forming pockets is illustrated in FIG. 6. As an example, the pocket 22 may be formed by bonding a layer 602 with a circle cut through it to the surface of a layer 601 with no hole. The pocket 24 may then be formed by bonding a layer 603 with a larger diameter hole atop the layer 602.

Figure 7A:
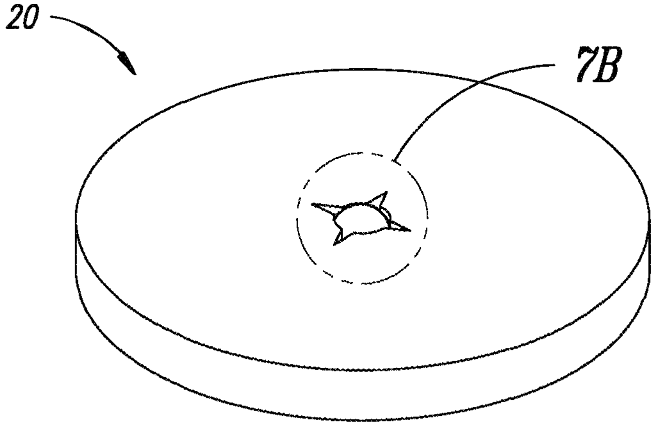
FIG. 7A is an axonometric illustration of a droplet of liquid metal in an open contact with dendritic channels.
Figure 7B:
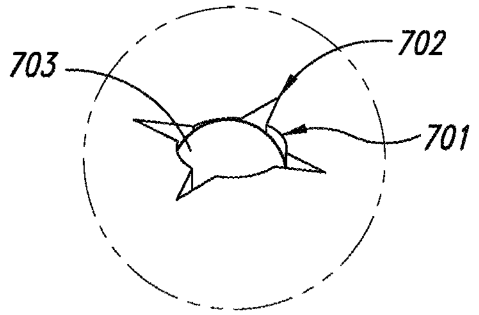
FIG. 7B is an enlarged detail view of a portion of FIG. 7A.

An alternate geometry could achieve the same purposes of first containing the liquid metal and second allowing it to spread when the movable contact applies pressure. This approach is illustrated in FIGS. 7A, 7B and 8A-8C. A complex shape is cut consisting of a central pocket 701, 801 and one or more arms or “dendrites” 702, 802 radiating from this shape. FIGS. 7A and 7B show the open contact in which the liquid metal 703 has not been compressed. The liquid metal 703 at rest naturally accumulates in the central pocket 701 for two reasons. First, a bottom surface of this central pocket 701 may have a different surface causing it to wet, or attract the liquid metal, while a bottom surface of the dendrites may be treated in a way to repel the liquid metal.

Figure 8A:
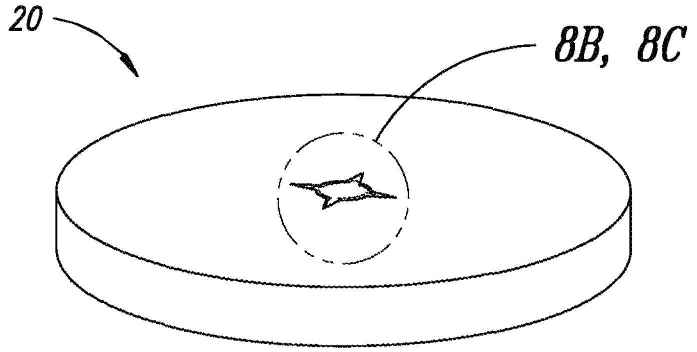
FIG. 8A is an axonometric illustration of a droplet of liquid metal in a closed contact with metal pushed into the channels.
Figure 8B:
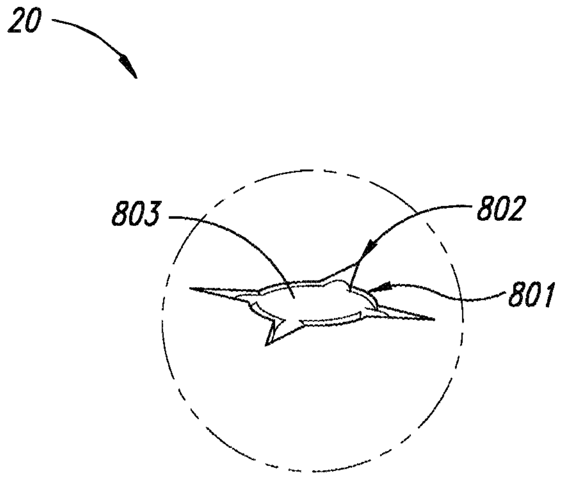
FIG. 8B is an enlarged detail view of a portion of FIG. 8A.
Figure 8C:
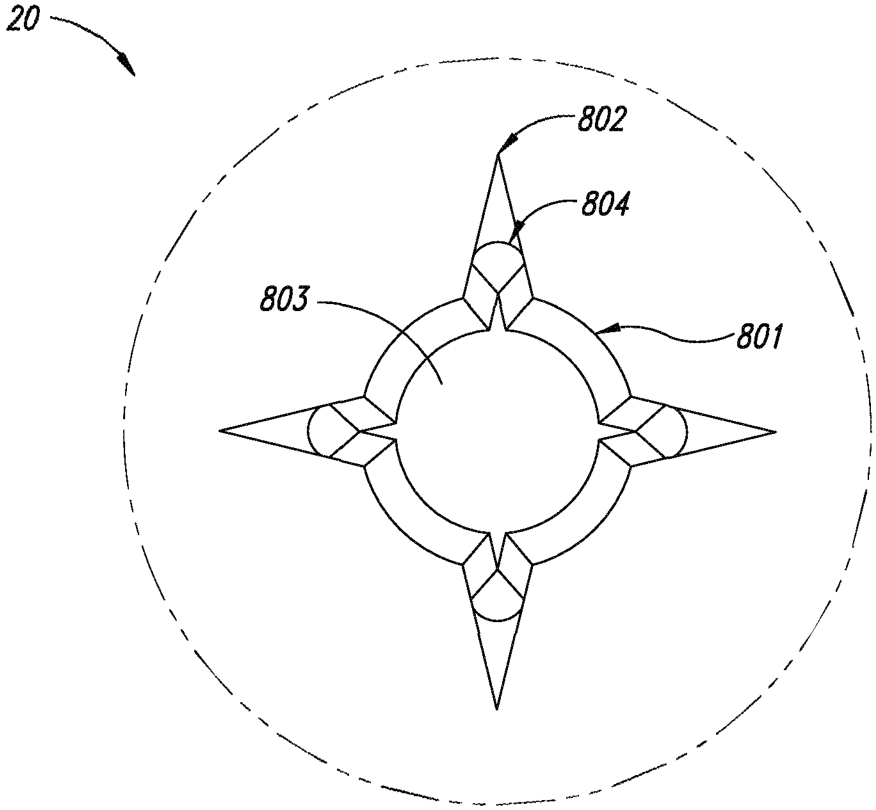
FIG. 8C is an enlarged top plan view of a portion of FIG. 8A.

FIGS. 8A-8C show the closed contact (with the upper contact not illustrated). In these FIGS. 8A and 8B, the liquid metal 803 is pushed into the dendrites 802. Its surface area increases. Surface tension then exerts a restoring force pulling the metal back into the central cavity. The geometry of the dendrites 802 can affect this restoring force. If the dendrites 802 are too broad, the restoring force is weaker as the surface area is not maximized. If the dendrites 802 are too narrow then the liquid metal may not enter the dendrites 802 to any appreciable amount. If the dendrites 802 are both long and narrow, then some of the liquid metal may form spherical or near spherical satellites in the dendrite cavity and this metal may become dissociated from the bulk of the liquid metal.

The ideal width of the dendrites or arms may be calculated by considering the pressure to which the liquid metal is subjected and surface tension forces resulting from driving it into the arms. For example, with a given actuation force available for compressing the material, the increase in pressure within the liquid metal is limited. In one design, this pressure can be 9.4 pounds per square inch (PSI). This pressure must balance with the resistance pressure caused by the curvature of the liquid metal surface as it bends into the arm. The pressure and the radius of curvature are inversely related as described by Laplace’s law. A pressure of 9.4 PSI will be balanced at a curvature dependent on the surface tension of the liquid metal. Literature values for surface tension for eutectic Galinstan range from 534 to 718 mN/m (milli-Newton/meter). This results in a minimum radius of curvature between 0.017 and 0.022 mm. This radius of curvature 804 is shown in FIG. 8C. Calculating using the lower surface tension value, with an arm width of 0.034 mm, the liquid metal can push entirely into the arm with 9.4 PSI of pressure. If the arm is narrower than two times the minimum radius of curvature described above, the liquid will only go part way into the arm, forming a dome-like protrusion with the minimum radius. This will result in much less available movement of liquid metal. If the arm is significantly wider than twice the minimum radius, the restoration force will be reduced due to the larger radius of the liquid metal pushed into the arm.

The volume available in one or more arms is the sum of the volumes in each arm accessible at the given pressure. The number of arms may be calculated by determining the volume of liquid metal which extends above the hard stop of the second contact. This volume must be displaced into the miniature reservoirs created by the arms. Calculating the accessible volume in each arm and dividing that into the volume above the hard stop minus the available volume in the main reservoir provides the minimum number of arms required to avoid the liquid metal from escaping the reservoir or pushing up the hard stop.

This alternate geometry using arms may be advantageous over the previously discussed approach using pockets with stepped diameters. In the case where the pocket is formed by a stack of layers, the dendritic pocket is formed with only two layers; one solid and one with the dendritic arms and main reservoir, while the stepped approach requires three layers; a first layer to provide the bottom of the hole and a second and a third layer to provide the two stepped pockets of different diameters.

Another implementation of the present disclosure uses a simple first pocket, only a section of the floor of which is treated to wet the liquid metal. When the liquid metal is compressed, it will flow outward onto the non-wetted surface. When the pressure is relieved, the liquid metal will be restored to its rest position by the forces generated from surface tension and from repulsion from the non-treated portion of the pocket floor.

The dimensions described below are representative for illustration. Other dimensions could work equally well depending upon the application. The shallower pocket 24 in FIGS. 1A and 1B is, in one representative implementation, 400 micrometers in diameter and 10 micrometers deep. In the center of this pocket 24 is the deeper section or pocket 22, which is, in one representative implementation, 200 micrometers in diameter and 35 micrometers total depth. The bottom 26 of the deeper pocket 22 is, in one representative implementation, 25 micrometers below the bottom 28 of the larger, shallower pocket 24. The bottom exposed surface 26, 28 of each pocket 22, 24, respectively, may have an intentionally designed surface finish. For example, each bottom surface 26, 28 may be polished, or finished with a matte texture, or with a patterned and/or tailored structure. In the sputter coater a mask is used to prevent coating of the bottom surface 28 of the larger pocket 24 or the top surface 30 of the first contact 20.

Figure 2:
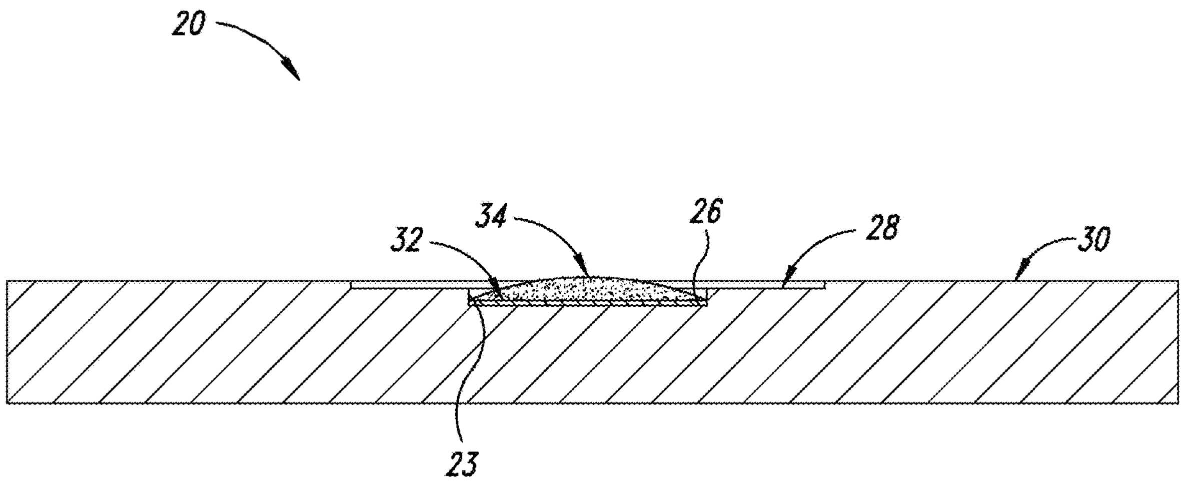
FIG. 2 illustrates wetting of a tantalum layer in the contact member of FIGS. 1A and 1B.

FIG. 2 shows an exaggerated tantalum layer 32 on the bottom surface 26 of the deeper pocket 22. Typically this layer is very thin. It may be deposited as a monolayer of atoms with a minimum thickness of four angstroms, the diameter of a single atom. This layer may be contiguous or may have some voids or pinholes. It may range in thickness from 4 angstroms to 100 angstroms, or from 1 nanometer to 10 nanometers, or from 10 nanometers to 1 micron, or from 1 micron to 100 microns, or from 100 to 1000 microns. A liquid metal coating 34 is formed by a droplet of Galinstan dispensed onto the tantalum layer 32. The first contact 20 is processed as described above to drive the reaction between the tantalum layer 32 and the Galinstan liquid metal coating 34 to a stable point. The liquid metal coating 34 is applied with sufficient volume to form a convex meniscus as seen in FIG. 2 that rises above the stop surface 30 of the first contact 20. Thus, when the first contact 20 is in contact with a movable flat electrode such as a second contact 36 as described below and shown in FIG. 4, any intermetallic layer on the surface of the tantalum layer 32 is not in contact with the movable flat electrode or second contact 36.

Figure 3:
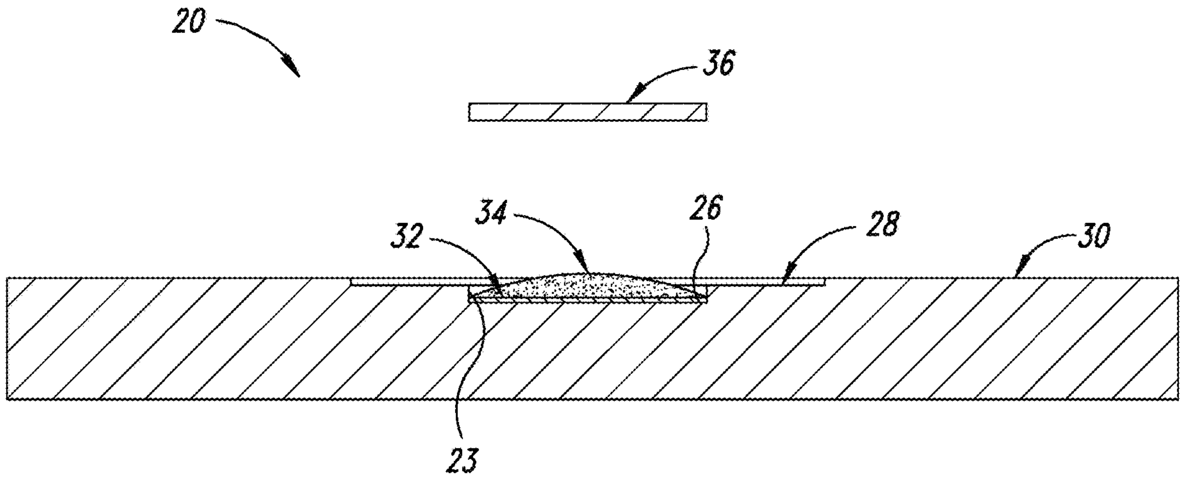
FIG. 3 illustrates a contact in an open state in accordance with the present disclosure.
Figure 4:
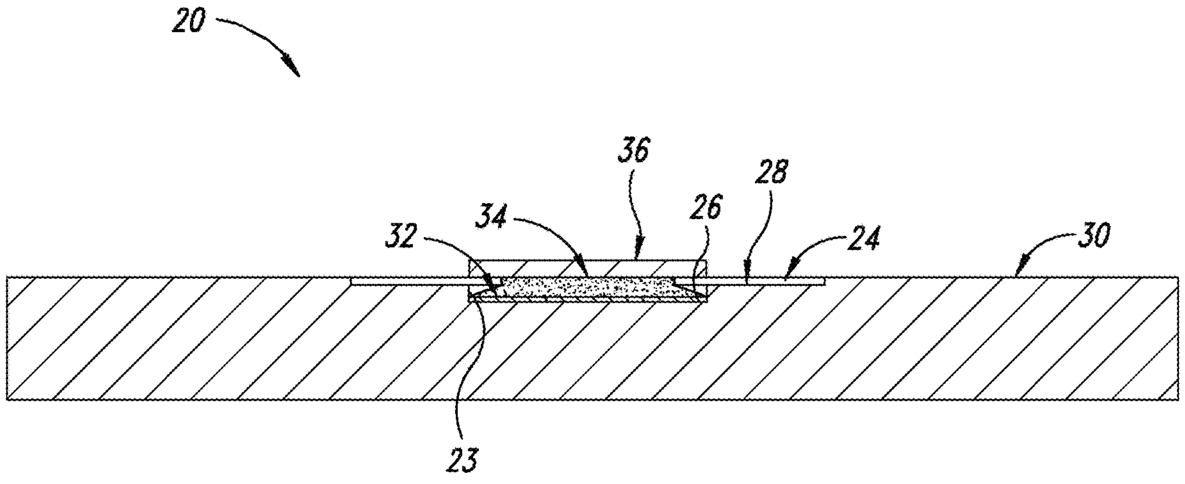
FIG. 4 illustrates a contact in a closed state in accordance with the present disclosure.

More particularly, FIG. 3 shows the second contact 36 positioned above the first contact 20 in an open state, and FIG. 4 shows the contacting of the opposing second contact 36 with the liquid metal coating 34 in a closed state. Ideally, this contact fits within a boundary of the larger, shallower outer pocket 24. A positive stop for the two contacts 20, 36 is provided by a metal-on-metal abutting at the bottom surface 28 around the perimeter of the shallower outer pocket 24. The liquid metal coating 34 is flattened by contact pressure from the second contact 36. The liquid metal coating 34 is retained mechanically by the wall 23 of the deeper pocket 22, and it is further kept in the desired location by chemical attraction to the tantalum layer 32 on the bottom 26 of the pocket 22 and by capillary repulsion from the bare metal (e.g., tungsten) elsewhere. Any excess liquid metal displaced by the pressure from the opposing second contact 36 flows into the shallower pocket 24. Upon opening of the contact 36, the liquid metal coating 34 is driven back into the meniscus shape because of the repulsive force between the metal (e.g., tungsten) of the first contact 20 and the liquid metal coating 34 as well as by the surface tension in the liquid metal coating 34.

Figure 5:
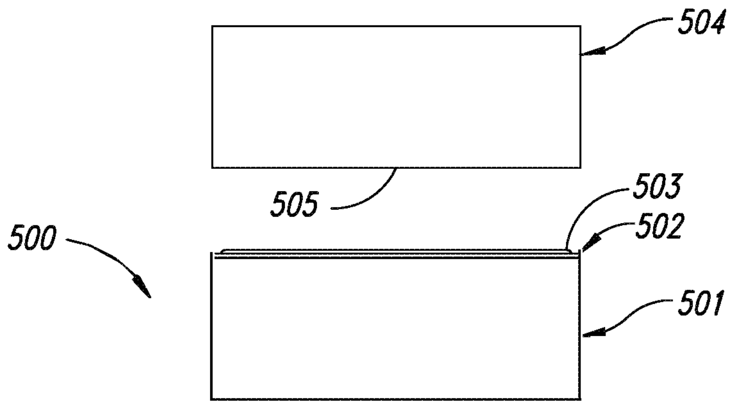
FIG. 5 illustrates a contact pair in which neither contact is machined with a pocket in accordance with the present disclosure.

FIG. 5 illustrates a contact pair in which neither contact is machined with a pocket. In this case, the first contact 500 is comprised of several materials. A base contact 501 with a flat upper surface is coated first with a bonding layer 502. A liquid metal layer 503 is then deposited atop the bonding layer 502. A second contact 504 has a flat lower surface 505. In FIG. 5 this contact is shown in the open position. In the closed position the contact 504 will be pressed against the liquid metal layer, making electrical contact. The liquid metal will be contained in this case by its attraction to the bonding layer 502.

It will be further appreciated from the foregoing that one advantage achieved by the present disclosure is adding a pocket to contain the Galinstan alloy, which prevents mechanical damage to the wetting intermetallic layer, increasing the durability of the contact. In addition, coating the metallic contact (e.g., tungsten) with a thin layer of tantalum allows wetting by a liquid metal such as Galinstan alloy, and it allows the use of tungsten for the bulk material. Tungsten has lower resistivity ($5.6*10^{-8}$ ohm-meter) than tantalum ($1.3 \& 10^{-7}$ ohm-meter) and therefore provides a lower resistance for the device.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An electrical contact, comprising:

a conductive base contact;

a layer of a second material resistant to reaction with a liquid metal, wherein the layer of the second material is adjacent to the base contact;

a layer of a third material, wherein the third material is a reaction product of a reactant metal with at least one metal of the liquid metal; and a layer of the liquid metal that wets to a surface of the third material.

2. The electrical contact of claim 1 wherein the conductive base contact comprises copper.

3. The electrical contact of claim 1, wherein the second material comprises tungsten, the third material comprises tantalum, and the liquid metal is a eutectic or near-eutectic alloy of gallium, indium, and tin.

4. The electrical contact of claim 1 wherein the third material comprises TaGa3; and the liquid metal is a eutectic or near-eutectic alloy of gallium, indium, and tin.

5. The electrical contact of claim 1, wherein the at least one metal is gallium.

6. The electrical contact of claim 1, wherein the layer of third material is adjacent to the layer of the second material.

7. The electrical contact of claim 1, wherein the liquid metal comprises sodium, potassium, cesium, rubidium, or an alloy of two or more of the group consisting of sodium, potassium, cesium, and rubidium.

8. The electrical contact of claim 1, wherein the second material comprises tungsten.

9. The electrical contact of claim 1, wherein the second material comprises ruthenium, titanium, tantalum, titanium nitride, tantalum nitride, tungsten nitride, niobium nitride, molybdenum nitride, titanium-tungsten alloy, tantalum carbide, cerium oxide, or graphene.

10. The electrical contact of claim 1, wherein the reactant metal is tantalum.

11. The electrical contact of claim 1, wherein the reactant metal is titanium, vanadium, chromium, iron, zirconium, niobium, ruthenium, molybdenum, tungsten, or rhenium.

12. The electrical contact of claim 1, wherein the third material comprises crystals of the reaction product.

13. The electrical contact of claim 1, wherein the reaction product is formed by reacting the reactant metal with gallium at a temperature in a range from 200 to 650° C.

14. The electrical contact of claim 1 wherein the conductive base contact comprises tungsten, molybdenum, tantalum, or niobium.

15. The electrical contact of claim 1, wherein the second material comprises tungsten, the third material comprises titanium, vanadium, chromium, iron, zirconium, niobium, ruthenium, molybdenum, tungsten, or rhenium, and the liquid metal is a eutectic or near-eutectic alloy of gallium, indium, and tin.

16. The electrical contact of claim 1, wherein the liquid metal comprises lithium.

17. The electrical contact of claim 1, wherein the layer of the second material is deposited onto the base contact by sputtering, chemical vapor deposition, or electrochemical deposition.

18. The electrical contact of claim 1, wherein the layer of the second material is bonded to the base contact.

19. The electrical contact of claim 6, wherein the layer of the third material is deposited onto the layer of the second material by sputtering, evaporation, chemical vapor deposition, electrochemical deposition, or colloidal film casting.

20. The electrical contact of claim 6, wherein the layer of the third material is bonded to the layer of the second material.

21. The electrical contact of claim 1 wherein the third material comprises a tantalum-gallium intermetallic material; and the liquid metal is a eutectic or near-eutectic alloy of gallium, indium, and tin.

22. The electrical contact of claim 1, wherein the reaction product is formed by reacting the reactant metal with gallium at a temperature of up to 1060° C.

* * * * *